United States Patent [19]

Porterfield

[11] Patent Number: 4,806,509

[45] Date of Patent: Feb. 21, 1989

[54] ALUMINUM RESISTANT REFRACTORY COMPOSITION

[75] Inventor: Andrew D. Porterfield, Redondo Beach, Calif.

[73] Assignee: VFR, Inc., King of Prussia, Pa.

[21] Appl. No.: 129,213

[22] Filed: Dec. 7, 1987

[51] Int. Cl.$^4$ .............................................. C04B 35/66
[52] U.S. Cl. ................................ 501/127; 501/105; 501/111; 501/120; 501/124; 501/125; 501/133; 501/151; 106/84; 106/85; 106/104
[58] Field of Search ............... 501/105, 124, 125, 127, 501/111, 120, 132, 133, 151; 106/84, 85, 104

[56] References Cited

U.S. PATENT DOCUMENTS

| | | | |
|---|---|---|---|
| 2,997,402 | 8/1961 | McDonald et al | 501/127 OR |
| 3,261,699 | 7/1966 | Henry | 501/127 X |
| 3,471,306 | 10/1969 | Rubin et al. | 501/125 OR |
| 4,088,502 | 5/1978 | La Bar | 501/124 OR |
| 4,126,474 | 11/1978 | Talley et al. | 501/125 OR |
| 4,158,568 | 6/1979 | La Bar | 106/104 X |
| 4,174,972 | 11/1979 | Drouzy et al. | 501/124 OR |
| 4,246,035 | 1/1981 | Maczura et al. | 501/124 OR |
| 4,510,253 | 4/1985 | Felice et al. | 501/124 X |
| 4,522,926 | 6/1985 | Felice | 501/124 X |

*Primary Examiner*—William R. Dixon, Jr.
*Assistant Examiner*—Karl Group
*Attorney, Agent, or Firm*—William W. Habelt

[57] ABSTRACT

A refractory composition for use in contact with molten aluminum alloys containing a refractory aggregate, a binder and an additive for imparting aluminum resistance to the refractory composition, the additive comprising synthetic calcium fluoride containing aluminum borate aggregate consisting essentially of 10 to 50% by weight boron oxide, 10–50% by weight of aluminum oxide, and 25–75% by weight calcium flouride. The synthetic aggregate may be prepared by blending boric acid, aluminum oxide, and fluorspor and firing the resultant blend at a temperature above 800° C. to form a synthetic aluminum borate having calcium fluoride contained in its insoluble structure.

11 Claims, No Drawings

ALUMINUM RESISTANT REFRACTORY COMPOSITION

BACKGROUND OF THE INVENTION

This invention relates in general to refractory compositions and, more particularly, to a specific refractory composition paticularily suitable for use in contact with molten aluminum alloys.

Refractory materials that come into direct contact with molten aluminum alloys, such as those used in aluminum melting furnaces, remelting furnaces, ladles, troughs, etc. are subject to disruptive attack, penetration, and adherence by various alloying elements, and by dross formed on the surface of the melt.

Historically, refractories used for these applications, mostly fired brick and phosphate bonded moldable refractories, were found to hold up to molten alloy for reasonable periods of time because the operating temperatures were kept relatively low and the alloys used were relatively mild. The refractory grains and binder used in these products were generally based on refractory materials designed for other industries, however, and these materials are not intrinsically resistant to reaction under aluminum melting and holding conditions. Procedures in the aluminum industry are changing, with increased emphasis on throughput rates and more severe alloys, with the result that the older refractories are becoming borderline in their acceptability.

There have been attempts made from time to time to improve the resistance of refractories to attack by molten aluminum alloys by the use of additive materials. McDonald, for example, in U.S. Pat. No. 2,997,402 describes the production of a glassy frit containing 15 percent to 80 percent boron oxide, 5 percent to 50 percent calcium oxide, and 2 percent to 60 percent aluminum oxide, and the production of a fired shape by blending the described frit with an aggregate, pressing and firing. Rubin, et al., in U.S. Pat. No. 3,471,306 improved upon this scheme by using similar ranges of ingredients, but forming the protective glassy frit in situ by virtue of the ingredients being in a reactive form. Both the McDonald and Rubin patents describe the production of bricks that are bonded by a glassy material. The implications of a continuous glassy phase thorugh a refractory are reduced refractoriness and decreased thermal shock resistance.

La Bar, in U.S. Pat. Nos. 4,088,502 and 4,158,568, describes the use of zinc borosilicate frit as an additive in calcium aluminate cement bonded silica and alumina based refractories to render them resistant to aluminum alloy attack. Maczura et al., in U.S. Pat. No. 4,246,035 uses this same additive, with the further addition of boric acid, in a high purity mortar to achieve resistance. Hines et al., in U.S. Pat. No. 4,348,236, discloses the use of calcium aluminate together with borosilicate frit, in particular a borosilicate frit containing 5-14 25% by weight fluorine, as an additive to an alumina refractory to improve aluminum resistance. While the use of zinc borosilicate frit is effective, the cost of commercially available material is higher by an order of magnitude than the additive of the invention described hereinafter, and it refractoriness is lower. Additionally, the presence of a glassy phase in a refractory body renders it more susceptible to thermal shock.

In U.S. Pat. No. 4,126,474, Talley, et al., described the use of $BaSO_4$ as an additive to render various types of refractory resistant to molten aluminum attack. A potential drawback to the use of this additive material is that, since most barium salts are toxic, care must be exercised to establish that conditions are not present in which the non-toxic $BaSO_4$ will decompose to form soluble barium compounds, or, if they are formed, that the refractory is subjected to hazardous waste disposal procedures after use.

Henry, in U.S. Pat. No. 3,261,699, and Drouzy, in U.S. Pat. No. 4,174,972, disclose a refractory material suitable for use as a lining material for furnaces and electrolytic cells used for the production of a aluminum wherein an additive material comprising at least one fluoride from the group consisting of alkali metal fluorides alkaline earth metal fluorides, aluminum fluoride and mixtures thereof is added to the refractory. However, fluorine compounds retard cement set times in castable compositions and effect the workability and shelf life of moldables. For these reasons calcium fluoride cannot be added directly to a refractory mixture to import improved aluminum resistance to a refractory mixture without also importing detrimental characteristics to the resultant mixture.

Felice et al., in U.S. Pat. No. 4,510,253, describes a refractory composition for use in contact with molten aluminum alloys containing alumina silica ceramic fiber, refractory binder, and an additive for importing aluminum resistance containing essentially crystalline $9Al_2O_3 \cdot 2B_2O_3$. In U.S. Pat. No. 4,522,926, Felice discloses another refractory composition for use in contact with molten aluminum alloys containing a refractory aggregate, a binder, and $9Al_2O_3 \cdot 2B_2O_3$, with the aluminum borate preferably being a by-product aluminum boron slag from the production of ferro-boron alloys.

The ferro-boron slag utilized by Felice (U.S. Pat. No. 4,522,926) contains relatively large quantities of iron oxide, magnesia and calcia impurities which decrease the refractoriness of products which contain this additive. The slag also contains fluctuating levels of boron and fluorine compounds which retard set times and destroy hydraulic bonding. These problems could be alleviated with a synthetic aluminum borate, however, at addition levels of 5-14 10 percent, the aluminum borate would be detrimental to the physical properties of a refractory and to the corresponding cost of a product containing that percentage of a synthetic additive.

SUMMARY OF THE INVENTION

In accordance with the present invention, there is provided a synthetic fused aluminum borate additive, effective to impart superior resistance to aluminum wetting and attack to a refractory material, a method of manufacturing the synthetic additive, and a refractory composition containing the additive in an amount effective to impart super aluminum resistance to the refractory composition.

The synthetic fused aluminum borate additive of the present invention comprises a calcium fluoride, aluminum borate aggregate wherein the calcium fluoride is dispersed within an insoluble structure provided by the fused aluminum borate. Preferably, the additive consists essentially of 10 to 50 percent by weight boron oxide, 10 to 50 percent by weight aluminum oxide, and 25 to 75 percent by weight calcium fluoride.

The synthetic additive of the present invention may be made by blending boric acid, calcined alumina, and fluorspor in relative amounts sufficient to provide a boron oxide content of from 10 to 50 percent by weight, an aluminum oxide content of from 10 to 50 percent by weight, and a calcium fluoride content of from 25 to 75 percent by weight. The resultant blend is then fired at a temperature of at least 800.C for a time sufficient to form a fused aluminum borate aggregate thereby locking the calcium fluoride in an insoluble structure. The calcined alumina and boric acid may be blended in relative amounts sufficient to provide a molar ratio of alumina to boron oxide ranging from two moles alumina to one mole boron oxide to nine moles alumina to two moles boron oxide. Alternatively, the calcined alumina and boric acid may be blended in relative amounts sufficient to provide a weight ratio of alumina to boron oxide of about 60 percent by weight alumina to about 40 percent by weight boron oxide.

The refractory composition of the present invention comprises a major portion by weight of refractory particles, an minor portion by weight of a refractory binder, said minor portion being a quantity at least sufficient to bind the refractory composition together, and at least 0.5 weight percent, and preferrably about 1.0 weight percent, of the synthetic fused alumina borate/calcium fluoride aggregate of the present invention.

DESCRIPTION OF THE PREFERRED EMBODIMENTS

In U.S. Pat. Nos. 4,510,253 and 4,522,926 there is disclosed a refractory material which was found to be essentially non-reactive with aluminum alloys. This material, referred to therein as "aluminum boron slag", is predominantly aluminum borate ($9Al_2O_3.2B_2O_3$) and corundum ($Al_2O_3$), with minor amounts of accessory minerals such as calcium fluoride ($CaF_2$), calcium aluminum borate ($CaAl_2B_2O_3$), and traces of some calcium aluminate phases. In these patents the active phase was the aluminum borate, and the other phases were considered variable in concentration or able to be eliminated entirely without effecting the ability of the slag to protect refractory materials from attack by molten aluminum alloys. It was also considered desirable that the aluminum borate be in the crystalline form $9Al_2O_3.2B_2O_3$ which is the most refractory of the possible combinations of $Al_2O_3$ and $B_2O_3$. Therefore, the $B_2O_3$ content was limited relative to the $Al_2O_3$ content so that there was little or no excess $B_2O_3$ to combine into other forms of aluminum borate.

A typical chemistry of such a slag in weight percent is as follows:

| | |
|---|---|
| $Al_2O_3$ | 85.5 |
| $B_2O_3$ | 6.0 |
| $SiO_2$ | 0.9 |
| $CaO$ | 3.1 |
| $MgO$ | 0.6 |
| $K_2O$ | 0.4 |
| $Na_2O$ | 1.1 |
| $Fe_2O_3$ | 0.9 |
| $CaF_2$ | 1.5 |

In the present invention, it has been found that the non-wetting properties of calcium fluoride as an aluminum resistant additive may be taken advantage of in combination with the non-etting properties of the aluminum borate while eliminating the detrimental effects on refractory properties associated with calcium fluoride. In accordance with the present invention the calcium fluoride is locked into the insoluble structure of the aluminum borate in a synthetic blend of calcium fluoride and aluminum borate.

The present invention utilizes calcium fluoride as the main non-wetting agent combined with aluminum borate ($9Al_2O_3.2B_2O_3$ and $2Al_2O_3.B_2O_3$) for additional aluminum resistance. However, the major purpose of the aluminum borate in this invention is to tie up the calcium fluoride within its insoluble structure and render it inert to the problems previously mentioned with castables and moldables. According to a preferred embodiment, this additive should contain 10-50% by weight boron oxide, 10-50% weight percent aluminum oxide and 25-75% calcium fluoride. The boron oxide and aluminum oxide may be added as boric acid and calcined alumina for cost considerations and in a ratio to form $2Al_2O_3.B_2O_3$ and $9Al_2O_3.2B_2O_3$, preferably 60% aluminum oxide and 40% boron oxide. The calcium fluoride may be added as fluorspar, either acid or ceramic grade, again for cost considerations. These ingredients are blended together and fired above 800 deg C to form the aluminum borate composition. The resulting synthetic aggregate has been to be effective as an additive to refractory compositions to impart resistance to wetting by aluminum at levels above 0.5% by weight. Preferably, the synthetic aggregate is added to the refractory composition in sufficient amount to constitute about 1% by weight of the composition.

A variety of commonly used refractory mixtures, including castable or moldable formulations, slurried compositions, and pre-form fired compositions, can be rendered resistant to molten aluminum alloys by incorporating a small quantity of the synthetic additive of the present invention into their formulation. By way of example, a castable refractory composition according to the present invention can be marketed either as a bagged castable material suitable for on-site installation and curing, or in precast and cured shapes. Castable formulations can utilize refractory aggregates such that the products will be light weight or high density as desired. A castable formulation expressed in weight percent is as follows:

| | RANGE |
|---|---|
| Refractory Aggregate | 75-99 |
| Refractory Aluminate Binder | 1-25 |
| Synthetic Aluminum Borate/ Calcium Fluoride Aggregate | >0.5 |

Further, the above solids formulation is typical of slurried refractory compositions wherein such a solids formulation is slurried in an aqueous solution, generally at a solids content ranging from 50 to 75 percent by weight.

A wide range of refractory aggregates may be used in the present invention such as chrome ore, bauxite, tabular alumina, silica, zirconia, spinel, magnesia-chrome, mullite and other alumina-silicates expanded clay and expanded shale. A wide range of refractory binder systems may be used in the present invention such as aluminum sulfate, sodium silicate, calcium aluminate, phosphate acid based binders, and other commercially available binders.

I claim:

1. A refractory composition resistant to attack by molten aluminum alloys consisting essentially of;
    a. from about 75 to 99 weight percent of refractory particles;

b. a refractory binde rin a quantity at least sufficient to bind said refractory composition together said binder selected from the group consisting of aluminum sulfate, sodium silicate, calcium aluminate, and phosphate acid base binders; and c. at least 0.5 weight percent of an additive effective to impart a non-wetting characteristic with respect to molten aluminum to the refractory composition, said additive consisting essentially of a synthetic fused aluminate borate aggregate containing calcium fluoride dispersed within the fused aluminum borate, said synthetic fused aluminate borate aggregate consisting essentially of a blend of 10 to 50 percent by weigh boron oxide, I0 to 50 percent by weight aluminum oxide, and 25 to 75 percent by weight calcium fluoride, said blend fired at a temperature of at least 800° C for a time sufficient to form a fused aluminum borate aggregate.

2. A refractory composition as recited in claim 1 wherein said additive consists essentially of a blend of boric acid, calcined alumina, and fluorspor in relative amounts sufficient to provide a boron oxide content of from 10 to 50 percent by weight, a aluminum oxide content of from 10 to 50 percent by weight, and a calcium fluoride content of from 25 to 75 percent by weight, said blend fired at a temperature of at lest 800° C for a time sufficient to form a fused aluminum borate aggregate.

3. A refractory composition as recited in claim 2 wherein the calcined alumina and boric acid are blended in relative amounts sufficient to provide a molar ratio of alumina to boron oxide ranging from two moles alumina to one mole boron oxide to nine moles alumina to two moles boron oxide.

4. A refractory composition as recited in claim 2 wherein the calcined alumina and boric acid are blended in relative amounts sufficient to provide a weight ratio of alumina to boron oxide of about 60 percent by weight alumina to about 40 percent by weight boron oxide.

5. A composition of matter functional as an additive to refractor compositions to impart a non-wetting characteristic with respect to molten aluminum to the refractor composition, consisting essentially of a synthetic fused aluminum borate aggregate containing calcium fluoride dispersed within the fused aluminum borate, said synthetic fused aluminum borate aggregate consisting essentially of a blend of 10 to 50 percent by weight boron oxide, I0 to 50 percent by weight aluminum oxide, and 25 to 75 percent by weight calcium fluoride, said blend fired at a temperature of at least 800° C for a time sufficient to form a fused aluminum borate aggregate.

6. A composition of matter as recited in claim 5 wherein said synthetic aggregate consists essentially of a blend of boric acid, calcined alumina, and fluorspor in relative amounts sufficient to provide a boron oxide content of from 10 to 50 percent by weight, a aluminum oxide content of from 10 to 50 percent by weight, and a calcium fluoride content of from 25 to 75 percent by weight, said blend fired at a temperature of at least 800° C for a time sufficient to form a fused aluminum borate aggregate.

7. A composition of matter as recited in claim 6 wherein the calcined alumina and boric acid are blended in relative amounts sufficient to provide a molar ratio of alumina to boron oxide ranging from two moles alumina to one mole boron oxide to nine moles alumina to two moles boron oxide.

8. A composition of matter as recited in claim 6 wherein the calcined alumina and boric acid are blended in relative amounts sufficient to provide a weight ratio of alumina to boron oxide of about 60 percent by weight alumina to about 40 percent by weight boron oxide.

9. A method of manufacturing an additive for refractory compositions to impart a non-wetting characteristic with respect to molten aluminum to the refractory composition, comprising:

a. blending boric acid, calcined alumina, and fluorspar in relative amounts sufficient to provide a boron oxide content of from 10 to 50 percent by weight, an aluminum oxide content from 10 to 50 percent by weight, and a calcium fluoride content of from 25 to 75 percent by weight; and b. firing said blend at a temperature of at least 800.C for a time sufficient to form a fused aluminum borate aggregate.

10. A method as recited in claim 9 wherein the calcined alumina and boric acid are blended in relative amounts sufficient to provide a molar ratio of alumina to boron oxide ranging from two moles alumina to one mole boron oxide to nine moles alumina to two moles boron oxide.

11. A method as recited in claim 9 wherein the calcined alumina and boric acid are blended in relative amount sufficient to provide a weight ratio of alumina to boron oxide of about 60 percent by weight alumina to about 40 percent by weight boron oxide.

* * * * *

UNITED STATES PATENT AND TRADEMARK OFFICE
CERTIFICATE OF CORRECTION

PATENT NO. : 4,806,509
DATED : February 21, 1989
INVENTOR(S) : ANDREW D. PORTERFIELD It is certified that error appears in the above—identified patent and that said Letters Patent is hereby corrected as shown below:

Column 1, Line 57, "5-14  25%" should read --5-25%--.
Column 2, line 43, "5-14 10" should read --5-10--.
Column 3, Line 4, "800.C" should read --800°C--.
Column 3, Line 64, "non-etting" should read --non-wetting--.
Claim 1, Column 5, Line 1, "binde rin" should read --binder in--.
Claim 1, Column 5, Line 14, "weigh" should read --weight--.
Claim 1, Column 5, Line 14, "IO" should read --10--.
Claim 2, Column 5, Line 26, "lest" should read --least--.
Claim 5, Column 5, Line 42, "refractor" should read --refractory--.
Claim 5, Column 5, lines 43-44, "refractor" should read --refractory--.
Claim 5, Column 5, Line 49, "IO" should read --10--.
Claim 9, Column 6, Line 36, "800.C" should read --800°C--.

Signed and Sealed this

Eighth Day of May, 1990

Attest:

HARRY F. MANBECK, JR.

Attesting Officer

Commissioner of Patents and Trademarks